United States Patent
Li et al.

(10) Patent No.: US 11,157,267 B1
(45) Date of Patent: Oct. 26, 2021

(54) EVALUATION OF DYNAMIC RELATIONSHIPS BETWEEN APPLICATION COMPONENTS

(71) Applicant: INTERNATIONAL BUSINESS MACHINES CORPORATION, Armonk, NY (US)

(72) Inventors: Jia Qi Li, Beijing (CN); Zhi Shuai Han, Beijing (CN); Fan Jing Meng, Beijing (CN); Amith Singhee, Bangalore (IN); David Scott Wenk, Byron Center, MI (US); Rahamim Katan, Modin (IL); Saravanan Krishnan, Bangalore (IN); Vini Kanvar, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/015,233

(22) Filed: Sep. 9, 2020

(51) Int. Cl.
| | |
|---|---|
| *G06F 9/44* | (2018.01) |
| *G06F 8/70* | (2018.01) |
| *G06N 5/02* | (2006.01) |
| *G06F 11/34* | (2006.01) |
| *G06F 8/35* | (2018.01) |

(52) U.S. Cl.
CPC .......... *G06F 8/70* (2013.01); *G06F 8/35* (2013.01); *G06F 11/3452* (2013.01); *G06N 5/02* (2013.01)

(58) Field of Classification Search
None
See application file for complete search history.

(56) References Cited

U.S. PATENT DOCUMENTS

| | | |
|---|---|---|
| 10,929,415 B1 * | 2/2021 | Shcherbakov .......... G06F 16/26 |
| 2010/0241690 A1 | 9/2010 | Kurapati et al. |
| 2011/0283269 A1 | 11/2011 | Gass et al. |

(Continued)

OTHER PUBLICATIONS

Gupta et al. "Discovering Dynamic Dependencies in Enterprise Environments for Problem Determination," IBM India Research Lab., New Delhi, Oct. 2003, 14 pages.

(Continued)

*Primary Examiner* — Qamrun Nahar
(74) *Attorney, Agent, or Firm* — Cantor Colburn LLP; Joseph Petrokaitis

(57) ABSTRACT

A computer-implemented method includes receiving, by a processor, real time operation data related to an application, identifying components of the application based on the operation data, extracting relationships and interdependencies between the components, and generating a graph of the identified components, the relationships and the interdependencies. The method also includes determining one or more dynamic metrics of the identified components, the one or more dynamic metrics indicative of interactions between the components, extracting statistical information describing at least one of performance and resource consumption based on the operation data, incorporating the dynamic metrics into the graph, determining a behavior of at least one component based on a pattern of appearance of the at least one component in the graph, and generating a model of the application based on the identified components and the determined behaviors.

20 Claims, 17 Drawing Sheets

(56) References Cited

U.S. PATENT DOCUMENTS

| | | | |
|---|---|---|---|
| 2014/0089888 A1 | 3/2014 | Bhaskara et al. | |
| 2014/0114442 A1* | 4/2014 | Li | G06F 11/0754 |
| | | | 700/47 |
| 2014/0335480 A1* | 11/2014 | Asenjo | G06Q 10/06 |
| | | | 434/107 |
| 2015/0212812 A1 | 7/2015 | Tripathi et al. | |
| 2017/0132194 A1* | 5/2017 | Lee | G06F 40/18 |
| 2018/0020024 A1* | 1/2018 | Chao | G06F 21/554 |
| 2020/0104401 A1* | 4/2020 | Burnett | G06F 16/2477 |
| 2021/0014263 A1* | 1/2021 | Soroush | G06F 21/57 |

OTHER PUBLICATIONS

Hasselmeyer, Peer "Managing Dynamic Service Dependencies," IT Transfer Office, Darmstadt University of Technology, Nov. 2001, 10 pages.

Richardson, Chris, "Refactoring a Monolith into Microservices," NGINX, Mar. 8, 2016, 11 pages.

* cited by examiner

DB2 log

Table     *JSON*           66

```
 1  ▽  {
 2         "_index": "ibmuser-db12v51,
 3         "_type": "doc_",
 4         "_id": "B0yTunEBYYwneJ6MNh1Y",
 5         "_version": 1,
 6         "_score": 0,
 7  ▽      "_source": {
 8            "db_exec_id": "0000000000010ABB79C5",
 9            "MEMBER":   "M01",
10         "TYPE":  " UNDO  REDO",
11         "URID":  "0000000000010ABB790B",
12         "LRSN":  "00D7D5069F71E80D4000",
13         "DBID":  "0001",
14         "DBID":  "00CF",
15         "PART":  "0001",
16         "PAGE":  "000001A2",
17         "SUBTYPE:"  "INSERT IN A DATA PAGE",
18         "date":   "20.118",
19         "time":   "02 : 50 : 25",
20         "CLR":  "NO",
21         "PROCNAME":  "DSNISGRT"
22      }
23  }
```

FIG. 2 CONT.

SYSLOG

| Table | JSON | 68 |

```
1   {
2       "_index": "syslog-2020.04.16",
3       "_type": "_doc",
4       "_id": "D-txtnEBYYwneJ6""Ms9Y",
5       "_version": 1,
6       "_score": 1,
7       "_source": 1 {
8           "(dtimestamp": "2020-04-16123:55:55.4202",
9           "Record type": "N",
10          "Message IV": "1EE2521",
11          "logMessage": "IEE2521 MEMBER IGGCAT00 FOUND IN ADCD.Z
12          "Message": "N\t400800\tS0N1\t2020-04-17 07:55:55.42\t
                       .PARMLIB\tMEMBER $ncmbcr$ FOUND IN $parmdsname$\t0"
13          "routing codes": "4000000",
14          "timestanp": "2020-04-17 07:55:55.42",
15          "variables": "(\"member\": \"IGGCAT00\", \"parmdsname\"
16          "Component": null,
17          "template_order": "0",
18          "@version": "1",
19          "flags": null,
20          "System name": "S0W1",
21          "template": "MEMBER $member$ FOUND IN $parmdsname$",
22          "lob identifier": "00000290"
23      },
24      "fields": {
25          "@timestamp": [
26              "2020-04-1eT23:55:55.4202"
27          ]
28      }
29  }
```

FIG. 2 CONT.

GENAPP log

Table  JSON    72

```
1   {
2     "_index": "ibmuser.genapp",
3     "_type": "doc_",
4     "_id": "nevhunEBYYwneJ6MdxkF",
5     "_version": 1,
6     "_score": 0,
7     "_source": {
8        "map name": "SSMAP",
9        "program _name": "LGTESTC1"
10    }
11  }
```

FIG. 2 CONT.

● Interaction frequencies from logs:

EVALUATION OF DYNAMIC RELATIONSHIPS BETWEEN APPLICATION COMPONENTS

BACKGROUND

The present invention generally relates to computer systems, and more specifically, to analyzing operation data to evaluate dynamic relationships between application components.

Understanding of applications, services and components, particularly the dependencies and relationships between components and services in an application, is important for tasks such as application monitoring, error detection and modernization. For example, application modernization entails taking a legacy application and reconfiguring the application architecture, services and/or features. Knowledge of the core relationships and interdependencies (e.g., program to program calls, transactions to programs, programs to screens, programs to databases, etc.) is used to recommend modernized application and data services as replacements.

SUMMARY

Embodiments of the present invention are directed to analyzing applications and application components. An embodiment of a computer-implemented method includes receiving, by a processor, real time operation data related to an application, identifying components of the application based on the operation data, extracting relationships and interdependencies between the components, and generating a graph of the identified components, the relationships and the interdependencies. The method also includes determining one or more dynamic metrics of the identified components, the one or more dynamic metrics indicative of interactions between the components, extracting statistical information describing at least one of performance and resource consumption based on the operation data, incorporating the dynamic metrics into the graph, determining a behavior of at least one component based on a pattern of appearance of the at least one component in the graph, and generating a model of the application based on the identified components and the determined behaviors.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention provide systems and methods for analyzing applications and application components. A system in accordance with aspects of the invention includes one or more processing devices configured to analyze dynamic relationships, interdependencies and interactions among components of an application architecture (also referred to as an application). The analysis includes extracting components of an application (e.g., program blocks, functions, interfaces, controllers, data access objects, data structures, etc.), and analyzing the components to determine dynamic relationships and interdependencies (e.g., dependencies, correlations) between components.

In aspects of the invention, the system is configured to incorporate extracted components and the dynamic relationships and interdependencies into a graph or other relational data structure. For examples, the system can construct a relational or topology graph (two- or three dimensional) by plotting the components as nodes and their dependencies and relationships as edges.

In embodiments of the invention, the system enriches the graph by identifying temporal and/or statistical characteristics of transactions and/or other interactions implemented by the application. These characteristics can include operational characteristics such as usage, complexity and transaction types; as well as business related characteristics such as resource consumption and criticality. The system can incorporate these characteristics into the graph to provide an overall picture of the application.

The system in accordance with aspects of the invention can also analyze the graph to extract temporal behavior patterns of extracted components. Based on this analysis, the system constructs a model of the application, and the constructed model can be used for various purposes, such as system updates and application modernization (microservices, for example).

Embodiments of the invention described herein provide a number of technical benefits and effects. For example, systems and computer-implemented methods in accordance with aspects of the invention can generate a comprehensive model of an application, including dynamic interactions and behaviors, which can be used to derive new services and microservices. The model accounts for all component interactions and dependencies, and can identify business functions and business context of code components by leveraging the operational data for runtime insights. Knowledge and evaluation of an application is further improved by incorporating areas and metrics of business interests, e.g., for better service optimization and maintenance/upgrade prioritization.

Figure 1:
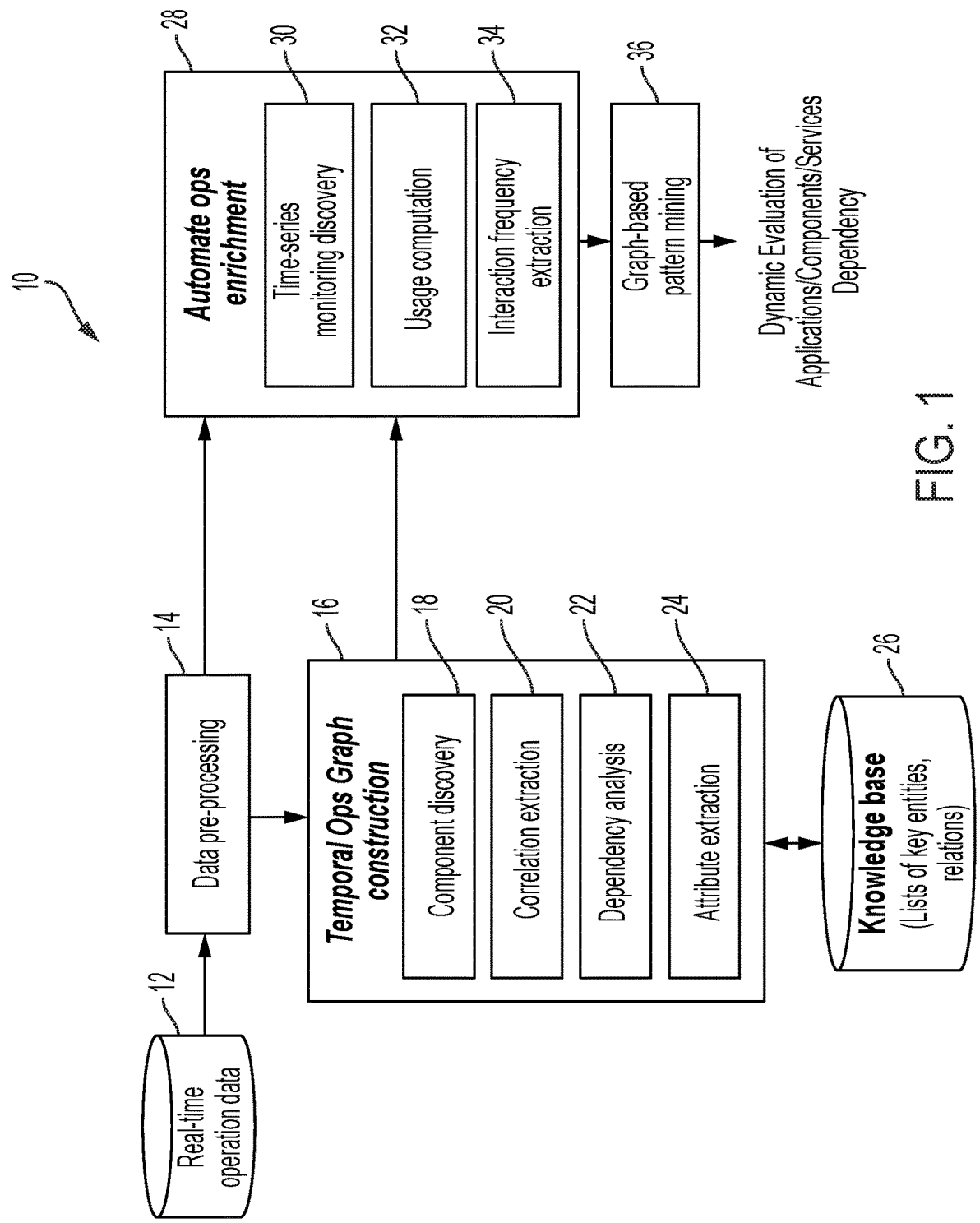
FIG. 1 is a block diagram of components of a system for analyzing an application, in accordance with one or more embodiments of the present invention.

FIG. 1 depicts a system for analyzing components of an application in accordance with embodiments of the invention. An "application" as described herein encompasses both a single application and a combination of individual applications as part of a computing system. The system 10 is configured to perform various functions related to acquisition of operation data from an application and analysis of the application based on the operation data.

The system 10 is configured to acquire operation data 12 from an application. In embodiments of the invention, the operation data is acquired in real time. A pre-processing module 14 receives the operation data and performs various pre-processing functions, such as formatting received operation data to a common format.

A graph construction module 16 is configured to generate a graph of component relationships and interdependencies. As described herein, a "graph" can be any data structure or representation that shows dynamic dependencies of application components. For example, the graph can be a two or three-dimensional representation of components as nodes or graph objects, such as a topology map or relational map, with relationships between nodes represented as edges.

The graph construction module 16 includes modules for performing functions related to identifying or discovering application components, determining relationships and interdependencies between components, and construction of graphs. For example, a component discovery module 18 identifies application components, a correlation extraction module 20 extracts correlations between components, a dependency analysis 22 module determines dependencies among the components, and an attribute extraction module determines statistical attributes of the components. This information is then used by the graph construction module 16 to generate a graph of the components. As discussed further below, functions of the graph construction module 16 include accessing reference data from a knowledge base 26 or other suitable storage location. It is noted that a "component" can be any part of an application, such as a module, data structure (e.g., table) and a service. Components as described herein are not limited to any specific example.

Outputs from the pre-processing module 14 and the graph construction module 16 are transmitted to an enrichment module 28. The enrichment module 28 adds metrics and statistical information related to dynamic interactions to the graph, e.g., as attributes of nodes and edges in the graph. These dynamic interactions are used to enhance or enrich the graph by providing time-dependent characteristics and temporal behavior of components.

Dynamic characteristics are related to behaviors of the components, i.e., changes in components or time dependent operations of components. For example, a time-series monitoring discovery module 30 determines temporal changes in components using time series data, a usage computation module 32 determines usage metrics, and an interaction frequency extraction module 34 determines the amount and frequency of interactions between components.

A pattern mining module 36 identifies patterns in the graph, which are used to extract typical or expected behaviors of components. These patterns can be used construct a model of the application, which describes the components, their interactions and dependencies, and behavioral characteristics.

Figure 2:
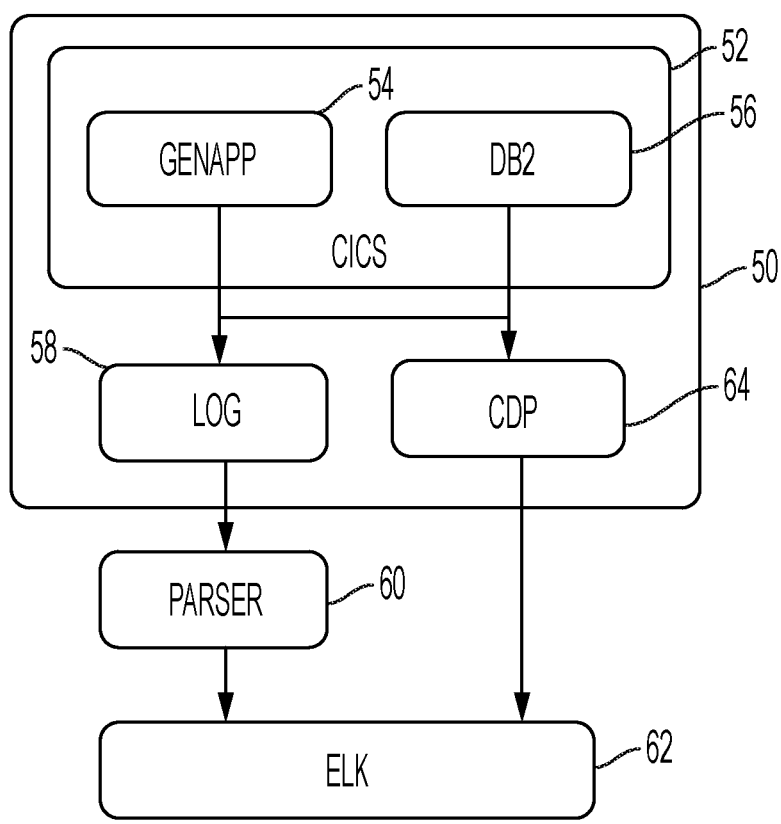
FIG. 2 depicts an example of a logging environment and operation data used by the system of FIG. 1 to analyze an application, in accordance with one or more embodiments of the present invention.

FIG. 2 depicts an example of a logging environment for collecting operation data from an application, and depicts examples of operation data. In embodiments of the invention, the logging environment and associated system (e.g., the system 10) is a distributed computing environment.

In the example depicted in FIG. 2, the application is configured to perform various mainframe system functions. The mainframe can be run according to a z/OS operating system from IBM Corporation. The logging environment includes an operating system 50, and a transaction module 52 for managing application and database transactions, such as Customer Information Control System (CICS) transaction server. The transaction module 52 can include subsystems or components, such as a transaction management module 54 and a database module 56 for controlling data in a database (DB2). The transaction management module 54 can be configured to monitor transactions and generate a log 58, which can be parsed by a parser 60 and stored in a desired storage location 62 of the transactions. Operational data can be collected, filtered and formatted by a common data provider 64 or other suitable module.

FIG. 2 also shows examples of operation data in the form of operation data logs. The examples include a database (DB2) log 66, a system log (SYSLOG) 68 and a transaction log 72. Other examples of logs include CICS logs and SMF logs taken by a system management facility (SMF)

Figure 3:
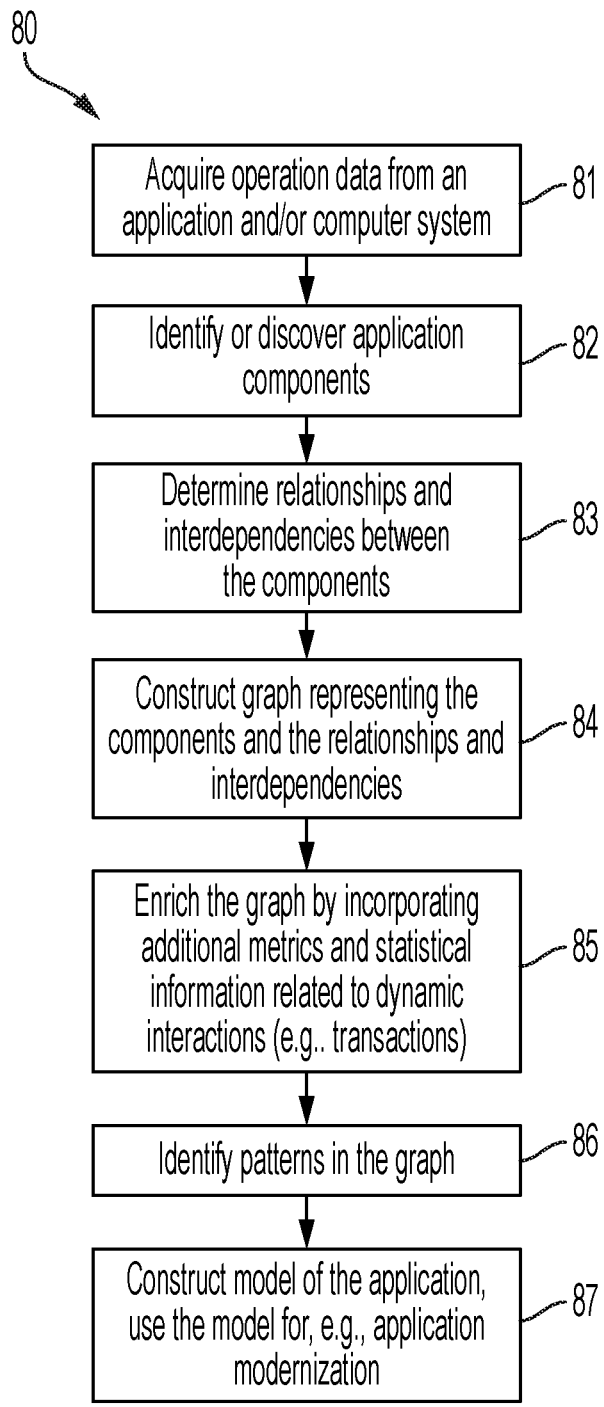
FIG. 3 is a flow diagram of a method of analyzing an application, in accordance with one or more embodiments of the present invention.

FIG. 3 illustrates a computer-implemented method 80 of analyzing an application in accordance with embodiments of the invention. The method 80 is implemented by the system 10 of FIG. 1. It is noted that aspects of the method 80 can be performed by any suitably configured processing device or system.

The method 80 includes a plurality of stages or steps represented by blocks 81-87, all of which can be performed sequentially. However, in some embodiments of the invention, one or more of the stages can be performed in a different order than that shown or fewer than the stages shown can be performed.

At block 81, operation data is acquired from an application. The operation data can include various operation logs acquired from the application and/or a monitoring or logging facility. Examples of operation data in the form of operation logs are shown in FIG. 2.

At block 82, the operation data is analyzed to extract components of the application. The components can be extracted using processes such as rule-based mining and/or data profiling. A component can be a module, data structure, service or any other part of an application that has a distinct functionality.

In embodiments of the invention, fields in the logs or other operation data are extracted, and the data values in each field are compared to known or typical patterns associated with different components. The known or typical patterns (reference patterns) can be acquired from historical data, e.g., in a database. If a field matches a reference pattern, a distribution of appearances of the field in the operation data is calculated. The distribution is compared to selected criteria (e.g., a distribution pattern, times, frequency other statistical metrics of appearance for distinct instances of the field, etc.).

If a field matches a reference pattern and satisfies the selected criteria, the field is recognized as an application component and stored as an entity, which can then be plotted as a node in a graph as discussed below.

At block 83, relationships and interdependencies between components are determined. Such relationships and interdependencies can be determined in various ways. For example, components recognized at block 82 are analyzed to determine relationships using correlation analysis, field mapping, temporal analysis on life cycle, and sequence mining dependency analysis.

At block 84, extracted components and their relationships and dependencies are applied to a topology or relational graph. In embodiments of the invention, the components are incorporated as objects or nodes in the graph, and the relationships and interdependencies are represented as edges.

At block 85, the graph is enriched to add dynamic metrics and/or statistical information indicative of dynamic interactions. For example, dynamic metrics including a count of interactions between a pair of components, frequency of interactions and/or timestamps of interactions are determined for each pair of components (if applicable). These metrics can be aligned to the objects representing the appropriate components in the graph. Statistical analysis can be performed to compute statistical metrics such as average CPU time, suspend time and others.

At block 86, graph-based pattern mining is performed to identify patterns of behavior of the components from the graph. At block 87, a model of the application can be produced. The model can be or include the enriched graph, or can be any type of model describing the application, components, component relationships, dynamic metrics and patterns of behavior.

The enriched graph and/or model is used to perform various functions, such as monitoring, performance evaluation, and updating. In embodiments of the invention, the graph and/or model is used to facilitate an application modernization process.

The method 80 can be used to facilitate building a modernization application model (including, e.g., an API interface model, a micro services model and a performance model) that can be optimized to business drivers, and can be mapped to the current state of application components.

Figure 4:
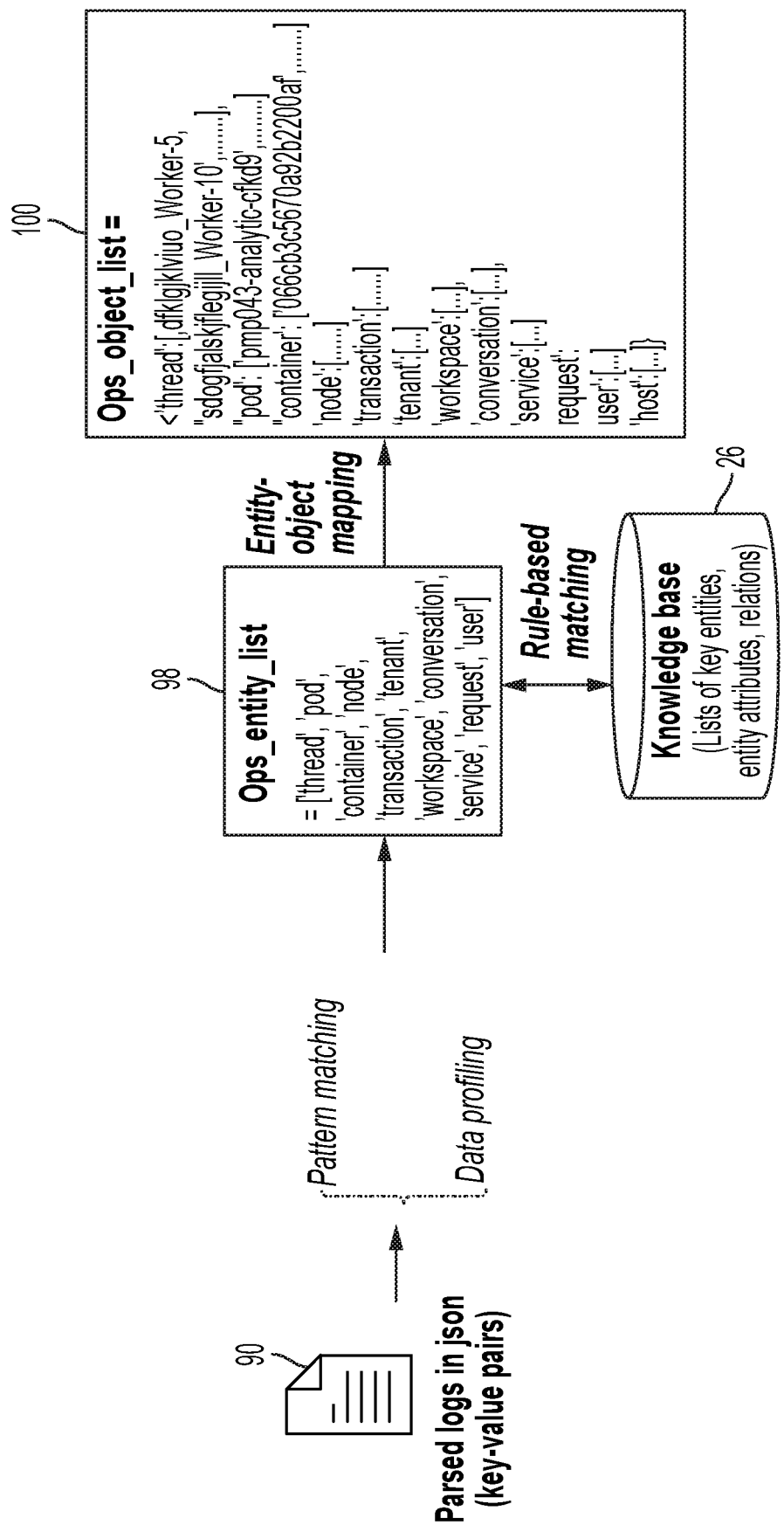
FIG. 4 is a flow diagram that illustrates an example of a process for identifying application components, in accordance with one or more embodiments of the present invention.
Figure 5:
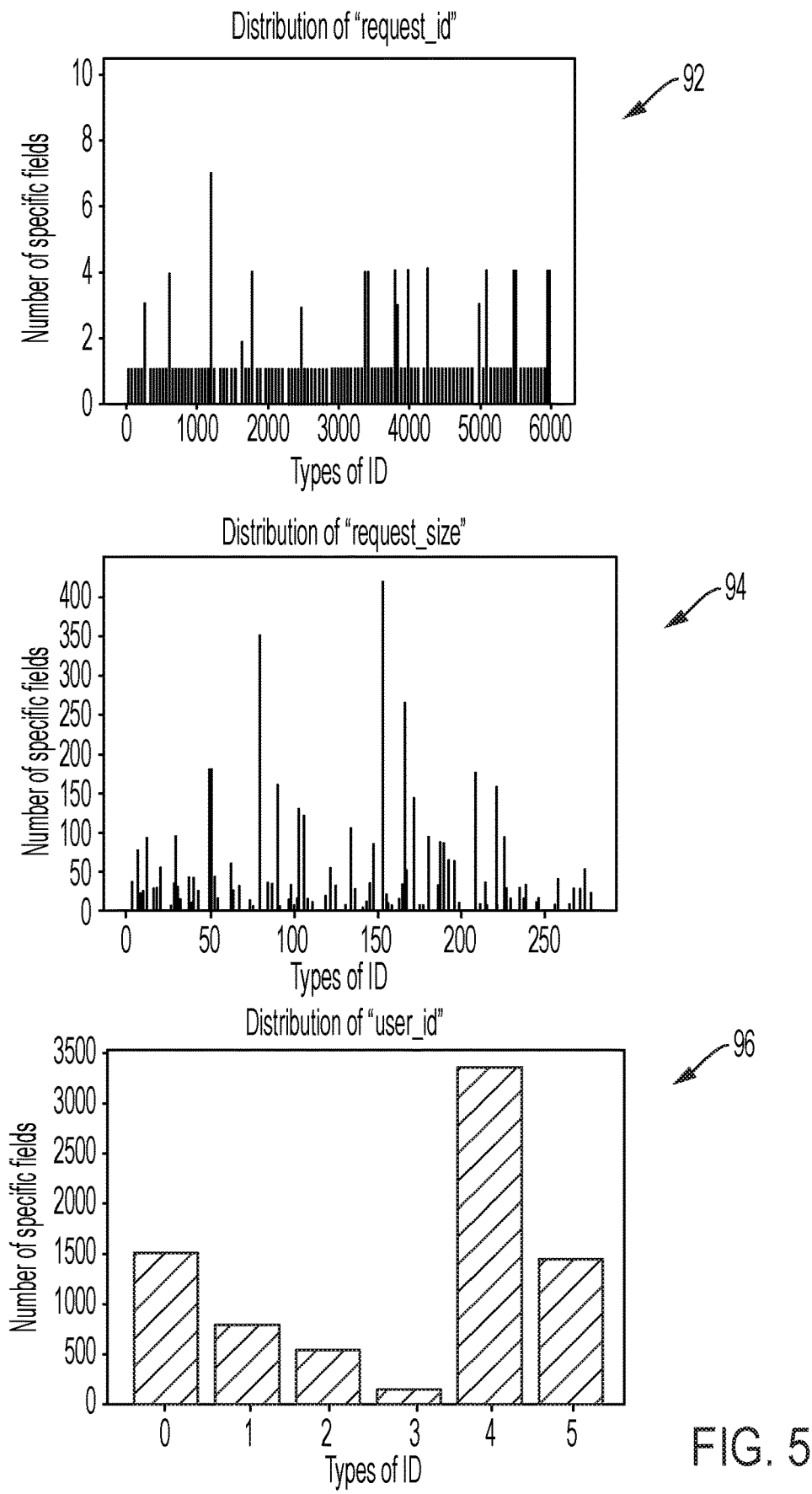
FIG. 5 depicts examples of distributions of application components that appear in operation data, in accordance with one or more embodiments of the present invention.

FIGS. 4 and 5 depict an example of a process for identifying or discovering application objects. This process can be performed according to block 83 of the method 80.

Referring to FIG. 4, fields in operation data 90 (such as the logs shown in FIG. 2) are extracted and can be identified as application entities by using both rule-based mining and data profiling. The application entities can subsequently be used to build a topology graph or other suitable data structure.

In this example, the operation data 90 is analyzed using rule-based mining by determining a pattern of values in each extracted field, and comparing the pattern to reference patterns. For example, reference patterns are acquired, e.g., from the database 26, which provide typical or expected patterns associated with different components.

Examples of patterns of values include patterns of values in identifiers (ID), such as ip addresses, unique identifiers (uuid) and URL addresses. The database 26 stores known patterns associated with known application components; the known patterns are derived from historical data and/or other sources of knowledge or information. It is noted that newly identified patterns can be stored in real time to update the database.

The following is an example of reference data patterns of IDs that could be used for comparison:
ip: (2(5[0-5]|[0-4]\d))|[0-1]?\d{1,2}
uuid: [0-9a-z]{8}-[0-9a-z]{4}-[0-9a-z]{4}-[0-9a-z]{4}-[0-9a-z]{12}
digits only: ^[0-9]*$
URL: URL: [a-zA-z]+:\\[^\s]*

If the pattern of values in a field matches a reference pattern, the field is identified as an entity that will be included in a graph. In embodiments of the invention, fields identified as entities are further analyzed to generate one or more data profiles. The data profile includes, for example, a distribution of appearances in the operation data 90 that indicates the use of a component. For example, as shown in FIG. 5, the distribution 92 represents the number of requests for a given request identifier, the distribution 94 represents the size of requests for a given request identifier, and the distribution 96 shows the number of requests for a given user identifier. In these distributions, "Type of ID" refers to a specific reference pattern. The distribution 92 shows the number of "request_id" fields in a log that match a given reference pattern, the distribution 94 shows the number of "request_size" fields in a log that match a given reference pattern, and distribution 96 shows the number of "user_id" fields in a log that match a given reference pattern. In this example, For example, for each field selected by the above step, the values of the field and times of appearance in all of the operation data 90 (or a selected subset) are counted and used to profile the distribution of the field (e.g., as distributions 92, 94 and/or 96). If the number of fields with identical or similar values is distributed relatively evenly (e.g., the number of requests or request size among different identifiers is within a selected threshold) and without extreme gaps, the field is identified or discovered as an entity to be used to build the graph. Instead, if the field has few numbers of values or large fluctuated distribution, the field can be discarded, i.e., not included as an entity.

If a distribution satisfies selected criteria related to the distribution(s), the associated entity is stored for use in constructing a graph. For example, each entity that matches a reference pattern and satisfies the distribution criteria is stored in a list or other data structure. An example of an entity list 98 is shown in FIG. 4 and denoted as "Ops_entity_list." The entity list includes entities such as thread entities, container entities, transaction entities, service entities, requests, and identities specific to the application. In the example of FIG. 4, the application includes such application specific entities include tenant, workspace and conversation entities.

The entities from the list can then be mapped to objects (if the system is object-oriented) in, e.g., an object list 100, that are subsequently plotted as part of the topology or relational graph.

Figure 6:
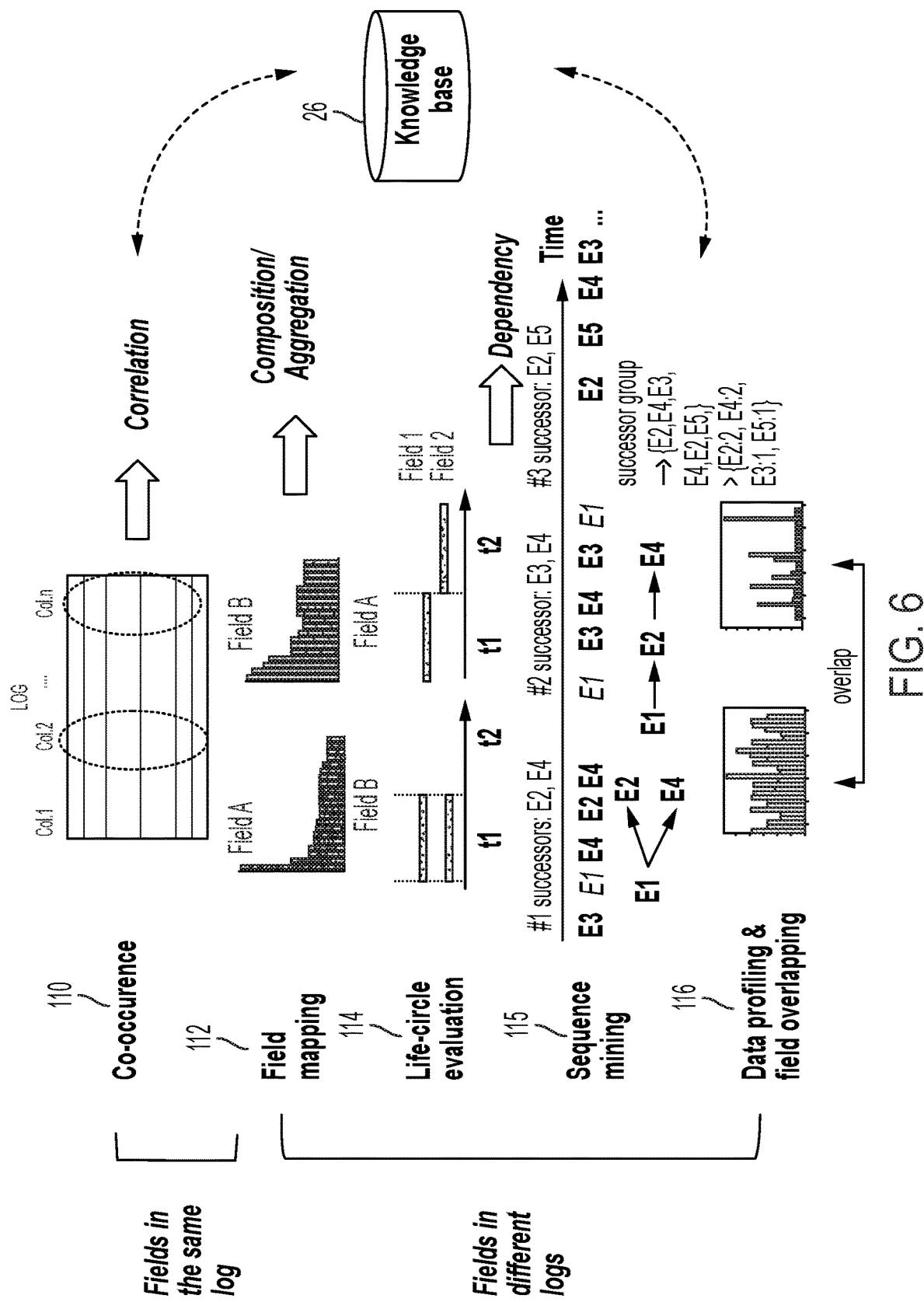
FIG. 6 depicts examples of processes for determining interdependencies and relationships between application components, in accordance with one or more embodiments of the present invention.

FIG. 6 depicts examples of processes for determining relationships and interdependencies between components.

These processes can be performed according to block 83 of the method 80. It is noted that the processes are discussed for illustration purposes and ae not intended to limit the types of processes and techniques that can be used to determine relationships and interdependencies.

For fields that occur repeatedly in the same log (co-occurrence), relations therebetween can be discovered through comprehensive correlation analysis by applying association rules and computing co-occurrence probabilities between each pair of entities. This process is represented graphically in FIG. 6 as process 110.

For fields that always appear in different logs, there are some relations between them in each log respectively. Using their common existing entities, connections among different logs can be found and relations between entities in different logs can be constructed.

For example, for entities that always appear in different logs, the distribution of their appearance in various logs is calculated. For entities in indexes of logs that have complete sets of data values, and/or distributions with multiple variations, the distribution can be calculated based on overall types or patterns of values. For entities that appear in indexes that show only part of the sets of data values, the distribution can be calculated as a function of references to the entities by other entities. By viewing and comparing the differences of the distributions of each specific entity in distinct indexes of logs, relations between unrelated entities co-connected with their affinities can be discovered.

FIG. 6 depicts examples of processes for determining relationships and interdependencies among field that occur in different logs. A field mapping process 112 can be performed to evaluate the number and distribution of fields as they appear in various logs. A life-cycle evaluation process 114 can be performed to determine similarities in life cycle between fields, such as similarities in run duration, similarities in frequency and/or distribution of run-time. Sequence mining 115 can be performed to extract temporal relationships between components, and a data profiling process 116 can be used to identify similarities or overlap between distributions of components.

Figure 7:
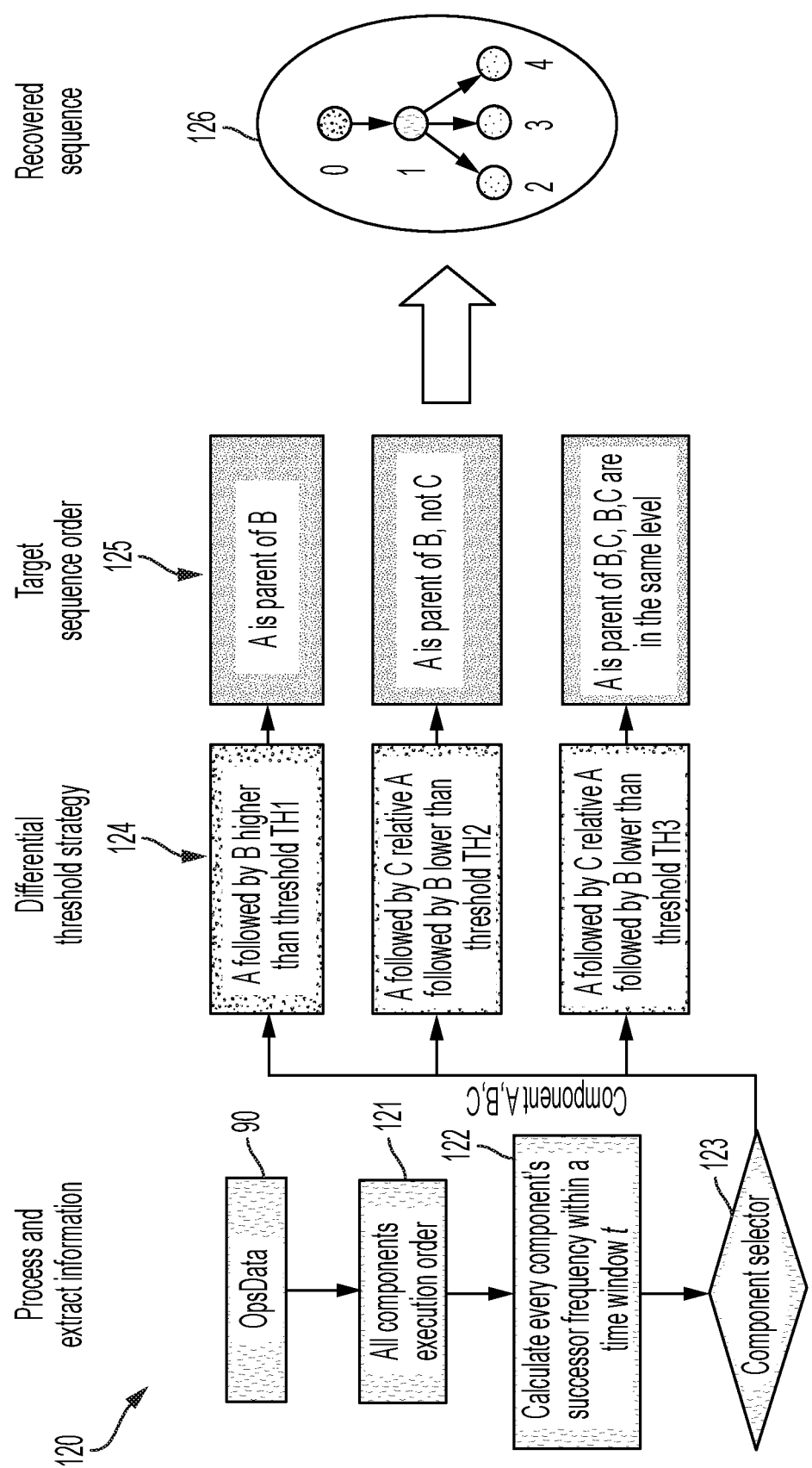
FIG. 7 is a flow diagram that illustrates a process of dependency analysis based on sequence discovery, in accordance with one or more embodiments of the present invention.

FIG. 7 depicts an example of a process 120 of recovering or identifying temporal sequences. The sequences can be used to determine temporal dependencies between components. This process can be performed as part of the method 80, specifically as part of the method discussed with reference to block 83

The sequence recovery process 120 is based on a differential selector-based threshold strategy to recover sequences in multi-thread environment. Operation data 90 is acquired and processed to extract components and perform any other desired processing. At block 121, the execution order of all extracted components (regardless of their types) is determined, and at block 122, every component's successor frequency within a time window t is calculated. At block 123, the components and their sequence and successor frequencies are transmitted to a designed component selector.

At blocks 124, the component selector analyzes the successor frequencies of each component and derives temporal dependencies of each component (block 125). In embodiments of the invention, the components are input to a designed component selector and/or other processing unit, which performs a differential threshold strategy to determine temporal dependencies and construct a sequence therefrom, such as the sequence 126 shown in FIG. 7.

For example, the component selector selects three components denoted as component A, component B and component C. Using the differential threshold strategy, temporal dependencies of on the component A are calculated. In this example, if the frequency at which B follows A within the time frame is greater than a threshold frequency TH1, then A is a parent of B. If the ratio of the frequency at which C follows A to the frequency at which B follows A is lower than a threshold TH2, then A is the parent of B, but not the parent of C. If the ratio of the frequency at which C follows A to the frequency at which B follows A is higher than threshold TH3, then A is the parent of B and C, and B and C are at the same level. With these dependencies, a sequence of the components A, B and C is constructed. In embodiments of the invention, sub-sequences of the components can be constructed, and recursively called to construct all the sequences of the operation data.

Figure 8:
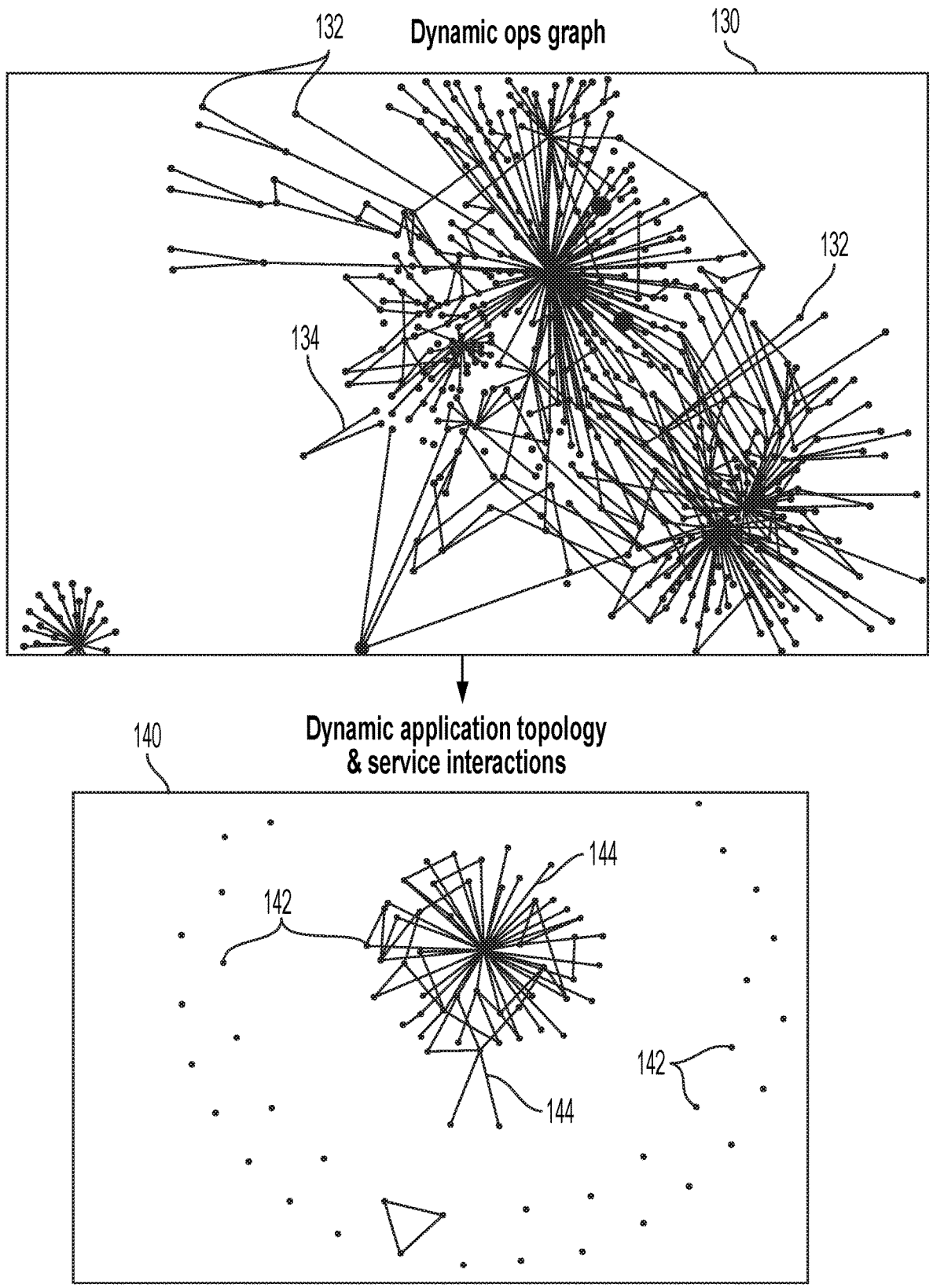
FIG. 8 depicts examples of temporal operation graphs generated according to the method of FIG. 3, in accordance with one or more embodiments of the present invention.

FIG. 8 depicts an example of a temporal operation graph configured as a topology or relational graphs that can be constructed according to the method 80. In this example, operation data is acquired and analyzed to identify components and determine the relationships and interdependencies. This information is plotted in a graph 130, in which instances of components extracted as entities or objects are plotted as nodes 132. The relationships and interdependencies between instances of components are plotted as lines or edges 134.

In this example, the graph 130 represents all components extracted from operation data and their relationships. Another graph 140 can be derived from the graph 130, which represents a subset of the components, specifically components representing the topology of the application and service interactions.

Figure 9:
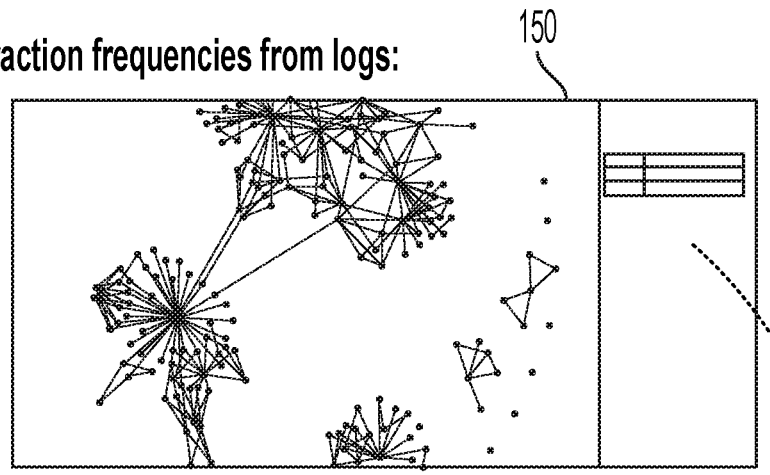
FIG. 9 depicts aspects of a process of incorporating dynamic interaction metrics and statistical information as attributes in a temporal operation graph, in accordance with one or more embodiments of the present invention.
Figure 9:
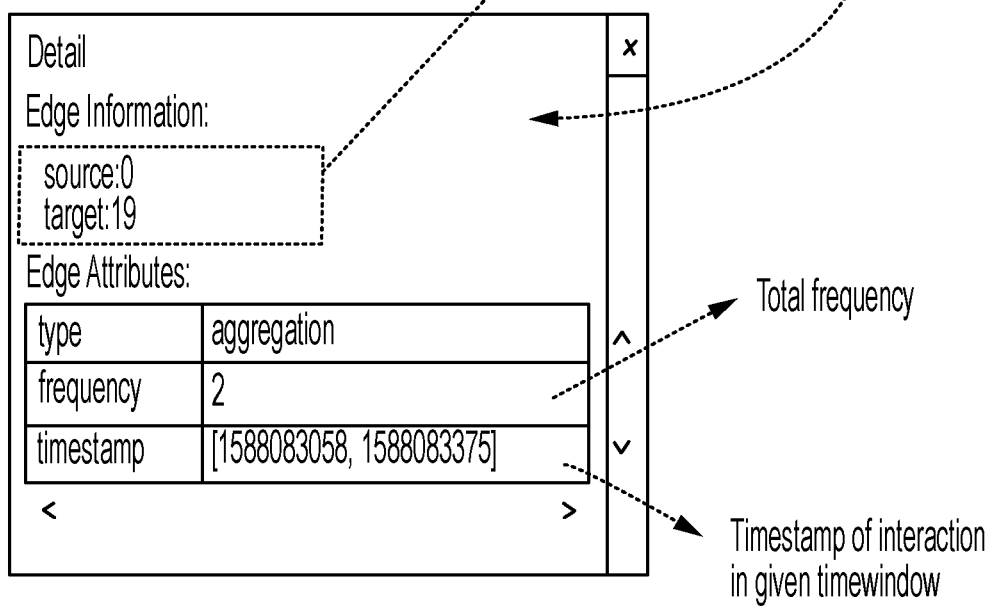
Figure 9:
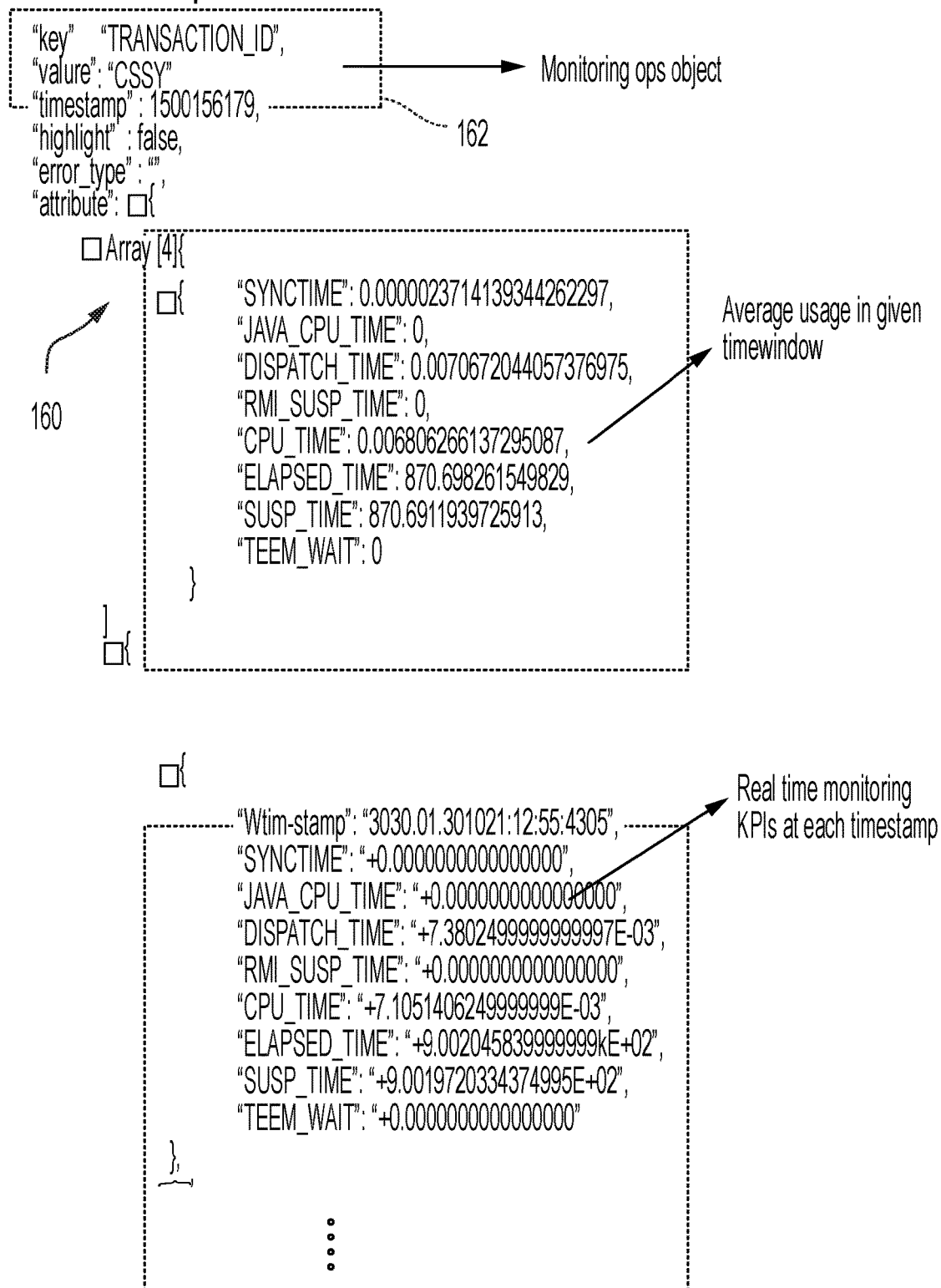

An example of graph enrichment (block 85) is shown in FIG. 9. In this example, dynamic metrics and statistical information are incorporated as attributes for nodes and edges in the graph, which are features extracted to capture and characterize component behaviors and interactions.

FIG. 9 shows an example of a temporal operation graph 150 that includes nodes and edges representing components and their relationships. Dynamic information is collected for each pair of components (instances) having an edge. The dynamic information in this example includes dynamic interaction metrics such as interaction count (number of interactions between the components), the frequency of interactions and timestamps of the interactions from logs in a given time window, which depicts how temporal interactions happen.

The graph 150 is enriched by incorporating the metrics for each pair of components as edge attributes, as shown in FIG. 9.

In addition to the dynamic metrics, statistical information regarding performance of components is derived and can be included as affinities or edge attributes. The statistical information, in embodiments of the invention, relates to resource consumption. Examples of statistical information include average CPU time, max suspend time, average usage in a given time window, etc., which monitor various aspects of a component from resource consumption and business performance.

FIG. 9 depicts an example of an application monitoring log 160, which includes various fields. A field 162 is extracted as an object from the log 160, and usage information related to the field is determined based on log information. As shown, the usage information can include average usage time within a given time window, and key performance indicators (KPI).

Based on the constructed temporal operation graph with dynamic information, behavior patterns of components are extracted using various techniques. The behavior patterns include, for example, temporal sequences of transactions, behavior of user access system, sequences of callable programs and services, behavior of table and dataset access, and others. These patterns can be extracted using techniques such as frequent item set analysis, longest common sub-sequence analysis and regularization methods to conduct frequent pattern mining.

In addition to determining behavior patterns, features of each node and edge can be analyzed to perform statistical modeling and characterize behaviors with more accurate portraits, which helps to cluster components with similar business functions or subareas with same context, e.g., for selection of replacement components as part of an application modernization process.

Figure 10:
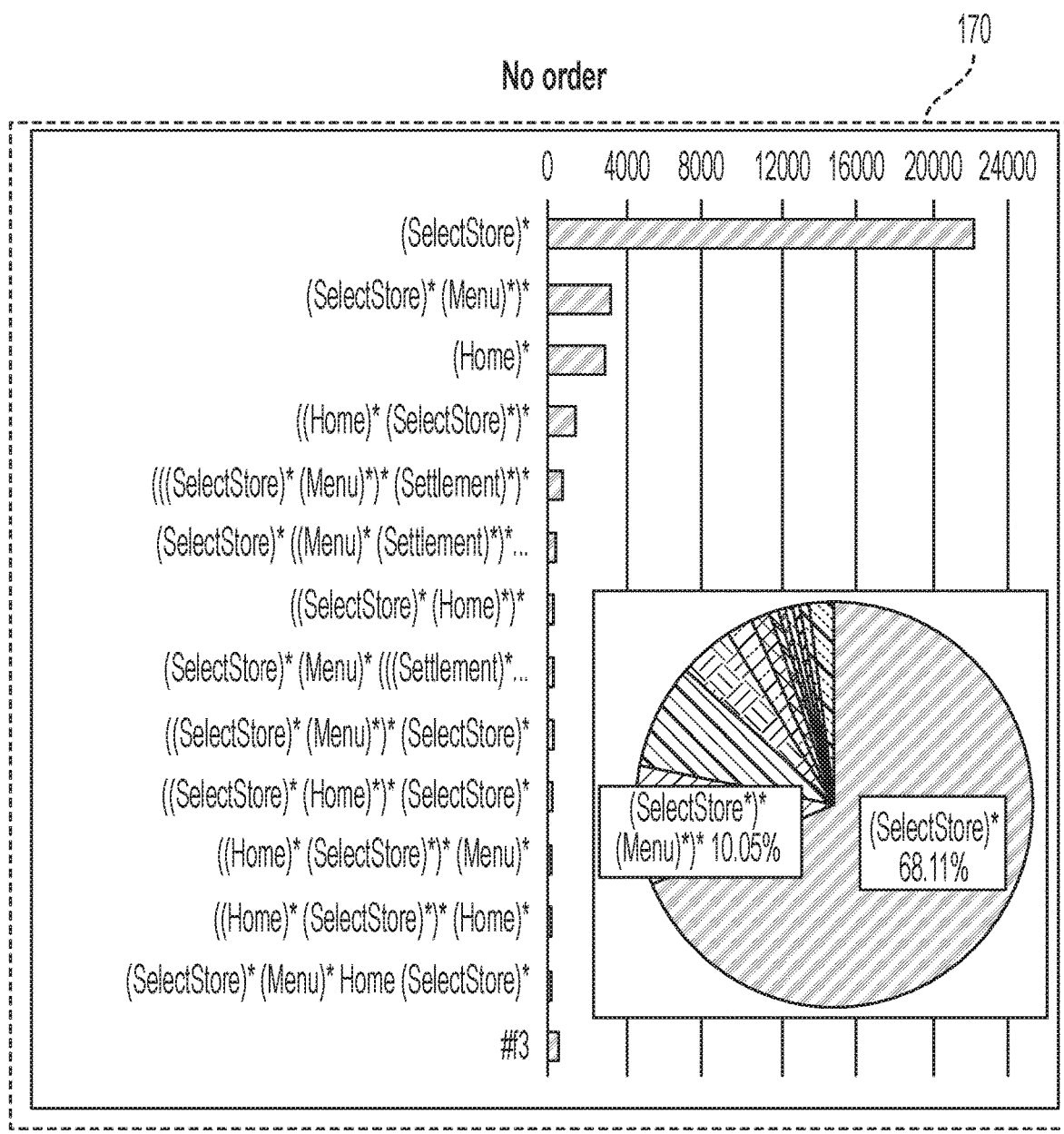
FIG. 10 depicts examples of patterns mined from a temporal operation graph generated according to the method of FIG. 3, in accordance with one or more embodiments of the present invention.
Figure 10:
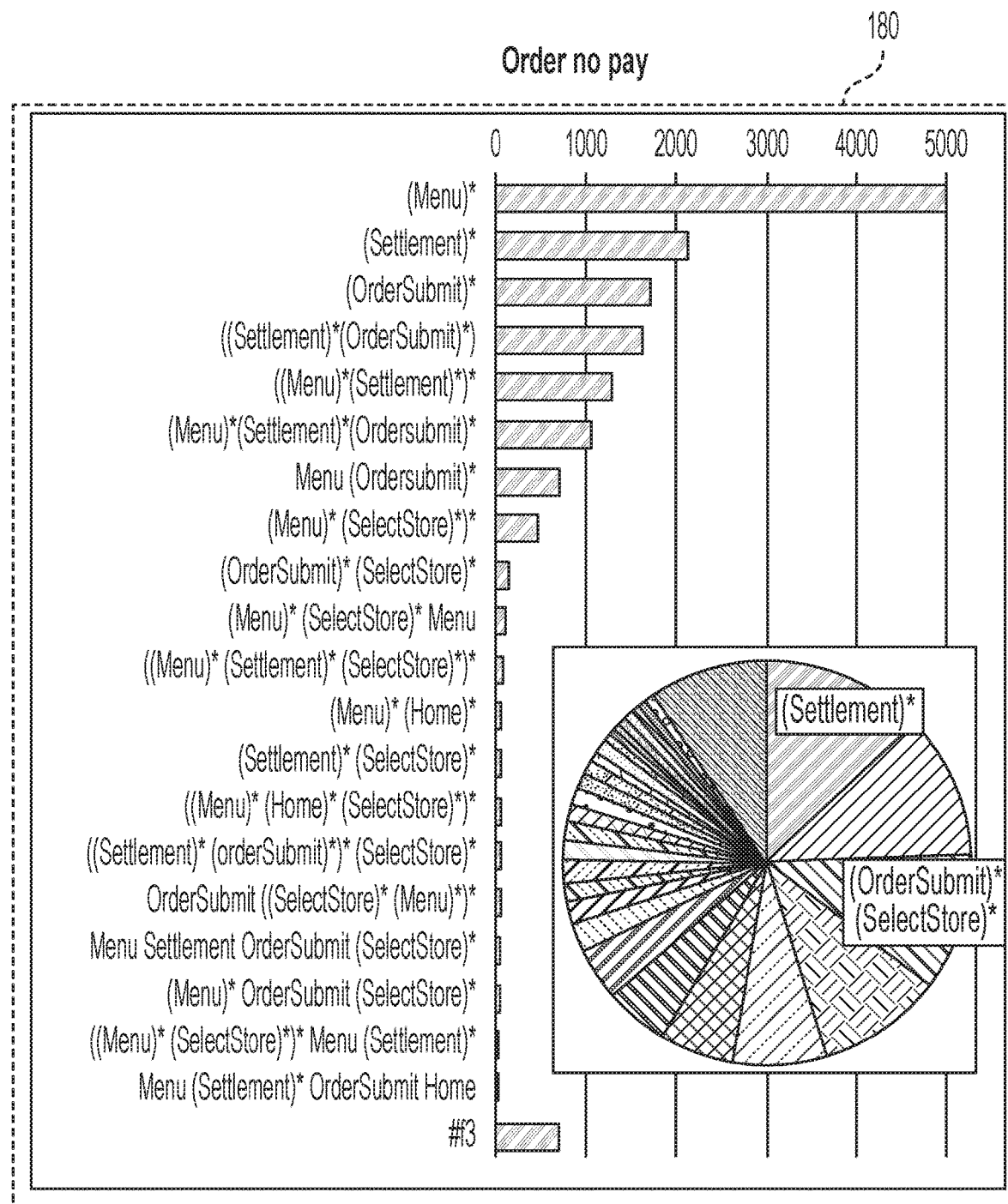
Figure 10:
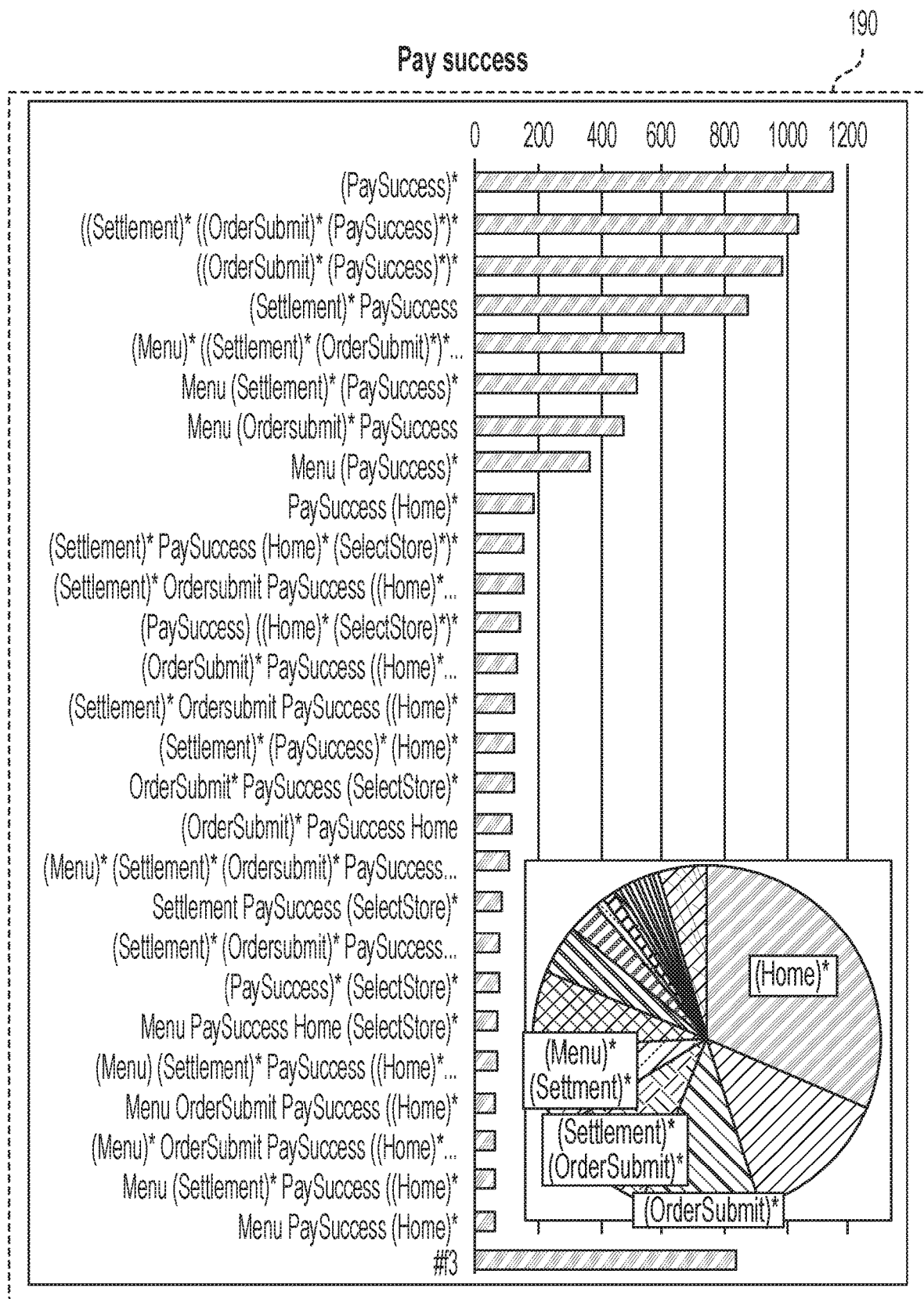

FIG. 10 depicts an example of patterns mined from a temporal operation graph. The pattern mining can be performed as part of the method 80 (at block 86). In this example, sequences of transactions and the behavior of a user access system are determined using frequent item set analysis, longest common sub-sequence analysis and/or regularization to identify frequent patterns of transactions.

In this example, components are analyzed to determine the patterns of access of various components. Based on the pattern mining, components in this example, are categorized to derive access counts. The categories in this example include components that are accessed without a customer order ("no order"), components that are accessed when an order is placed but not paid for ("order no pay") and components that are accessed when an order is placed and payment is successful ("pay success"). As shown, each category is represented by a respective distribution 170, 180 and 190 that shows the how often various components are accessed or used within each category.

Figure 11:
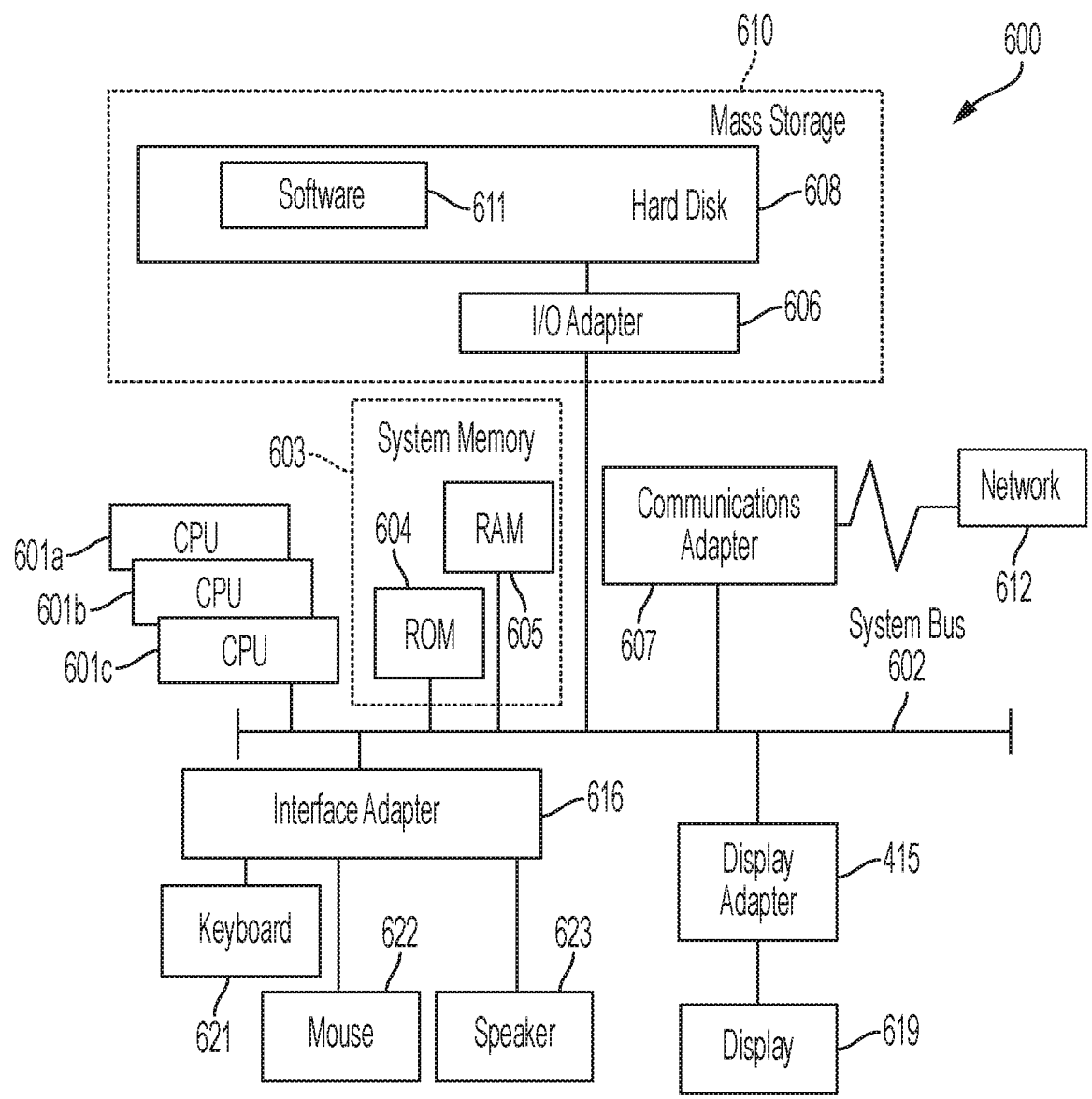
FIG. 11 depicts a computer system that can be used to analyze an application, in accordance with one or more embodiments of the present invention.

Referring to FIG. 11, a computer system 600 is generally shown in accordance with embodiments of the invention. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 can be, for example, a server, desktop computer, laptop computer, tablet computer, or smartphone. In some examples, computer system 600 can be a cloud computing node. Computer system 600 can be described in the general context of computer system executable instructions, such as program modules, being executed by a computer system. Generally, program modules can include routines, programs, objects, components, logic, data structures, and so on that perform particular tasks or implement particular abstract data types. Computer system 600 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 11, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and can include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 can be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 can be stored in the mass storage 610. The mass storage 610 is an example of a tangible storage medium readable by the processors 601, where the software 611 is stored as instructions for execution by the processors 601 to cause the computer system 600 to operate, such as is described herein with respect to the various Figures. Examples of computer program products and the execution of such instruction is discussed herein in more detail. The communications adapter 607 interconnects the system bus 602 with a network 612, which can be an outside network, enabling the computer system 600 to communicate with other such systems. In embodiments of the invention, a portion of the system memory 603 and the mass storage 610 collectively store an operating system, which can be any appropriate operating system, such as the z/OS or AIX operating system from IBM Corporation, to coordinate the functions of the various components shown in FIG. 11.

Additional input/output devices are shown as connected to the system bus 602 via a display adapter 615 and an interface adapter 616 and. In embodiments of the invention, the adapters 606, 607, 615, and 616 can be connected to one or more I/O buses that are connected to the system bus 602 via an intermediate bus bridge (not shown). A display 619 (e.g., a screen or a display monitor) is connected to the system bus 602 by a display adapter 615, which can include a graphics controller to improve the performance of graphics intensive applications and a video controller. A keyboard 621, a mouse 622, a speaker 623, etc. can be interconnected to the system bus 602 via the interface adapter 616, which can include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 11, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments of the invention, the communications adapter 607 can transmit data using any suitable interface or protocol, such as the internet small computer system interface, among others. The network 612 can be a cellular network, a radio network, a wide area network (WAN), a local area network (LAN), or the Internet, among others. An external computing device can connect to the computer system 600 through the network 612. In some examples, an external computing device can be an external webserver or a cloud computing node.

It is to be understood that the block diagram of FIG. 6 is not intended to indicate that the computer system 600 is to include all of the components shown in FIG. 11. Rather, the computer system 600 can include any appropriate fewer or additional components not illustrated in FIG. 11 (e.g., additional memory components, embedded controllers, modules, additional network interfaces, etc.). Further, the embodiments of the invention described herein with respect to computer system 600 can be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments of the invention.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments of the invention, various functions or acts can take place at a given location and/or in connection with the operation of one or more apparatuses or systems. In some embodiments of the invention, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments of the invention were chosen and described in order to best explain the principles of the disclosure and the practical application, and to enable others of ordinary skill in the art to understand the disclosure for various embodiments of the invention with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a processor, real time operation data related to an application;
   identifying components of the application based on the operation data;
   extracting relationships and interdependencies between the components;
   generating a graph of the identified components, the relationships and the interdependencies;
   determining one or more dynamic metrics of the identified components, the one or more dynamic metrics indicative of interactions between the components;
   extracting statistical information describing at least one of performance and resource consumption based on the operation data;
   incorporating the dynamic metrics into the graph;
   determining a behavior of at least one component based on a pattern of appearance of the at least one component in the graph; and
   generating a model of the application based on the identified components and the determined behaviors.

2. The computer-implemented method of claim 1, wherein the graph comprises a relational graph in which the identified components are represented as nodes, and the relationships and the interdependencies are represented as edges.

3. The computer-implemented method of claim 1, wherein identifying the components includes extracting a plurality of fields from the operation data, comparing a pattern of data values in each field of the plurality of fields to a reference pattern, and identifying the data structure as an application component based on the comparing.

4. The computer-implemented method of claim 2, wherein identifying the components includes generating a distribution of appearances of each field in the operation data.

5. The computer-implemented method of claim 1, wherein the one or more dynamic metrics is selected from the group consisting of a number of interactions, a frequency of interactions and timestamps of interactions.

6. The computer-implemented method of claim 5, wherein the statistical information includes statistical characteristics of the interactions.

7. The computer-implemented method of claim 2, wherein incorporating the dynamic metrics into the graph includes including the dynamic metrics as attributes of one or more entities and edges.

8. The computer-implemented method of claim 1, wherein determining the behaviors includes extracting temporal sequences of interactions between components.

9. The computer-implemented method of claim 8, wherein determining the behaviors of the components includes deriving patterns of the interactions based on the temporal sequence.

10. The computer-implemented method of claim 1 further comprising performing an application modernization process based on the model of the application.

11. A system comprising:
a memory having computer readable instructions; and
one or more processors for executing the computer readable instructions, the computer readable instructions controlling the one or more processors to perform operations comprising:
  receiving real time operation data related to an application;
  identifying components of the application based on the operation data;
  extracting relationships and interdependencies between the components;
  generating a graph of the identified components and the relationships and interdependencies;
  extracting one or more dynamic metrics of the identified components, the one or more dynamic metrics indicative of interactions between the components;
  extracting statistical information describing at least one of performance and resource consumption based on the operation data;
  incorporating the dynamic metrics into the graph;
  determining a behavior of at least one component based on a pattern of appearance of the at least one component in the graph; and
  generating a model of the application based on the identified components and the determined behaviors.

12. The system of claim 11, wherein the graph comprises a relational graph in which the identified components are represented as nodes, and the relationships and the interdependencies are represented as edges.

13. The system of claim 11, wherein identifying the components includes extracting a plurality of fields from the operation data, comparing a pattern of data values in each field of the plurality of fields to a reference pattern, and identifying the data structure as an application component based on the comparing.

14. The system of claim 12, wherein identifying the components includes generating a distribution of appearances of each field in the operation data.

15. The system of claim 11, wherein the one or more dynamic metrics is selected from the group consisting of a number of interactions, a frequency of interactions and timestamps of interactions.

16. The system of claim 15, wherein the statistical information includes statistical characteristics of the interactions.

17. A computer program product comprising a computer readable storage medium having program instructions embodied therewith, the program instructions executable by one or more processors to cause the one or more processors to perform operations comprising:
  receiving real time operation data related to an application;
  identifying components of the application based on the operation data;
  extracting relationships and interdependencies between the components;
  generating a graph of the identified components and the relationships and interdependencies;
  extracting one or more dynamic metrics of the identified components, the one or more dynamic metrics indicative of interactions between the components;
  extracting statistical information describing at least one of performance and resource consumption based on the operation data;
  incorporating the dynamic metrics into the graph;
  determining a behavior of at least one component based on a pattern of appearance of the at least one component in the graph; and
  generating a model of the application based on the identified components and the determined behaviors.

18. The computer program product of claim 17, wherein the graph comprises a relational graph in which the identified components are represented as nodes, and the relationships and the interdependencies are represented as edges.

19. The computer program product of claim 17, wherein identifying the components includes extracting a plurality of fields from the operation data, comparing a pattern of data values in each field of the plurality of fields to a reference pattern, and identifying the data structure as an application component based on the comparing.

20. The computer program product of claim 17, wherein the one or more dynamic metrics is selected from the group consisting of a number of interactions, a frequency of interactions and timestamps of interactions.

* * * * *